United States Patent [19]

Jordan

[11] Patent Number: 5,022,073
[45] Date of Patent: Jun. 4, 1991

[54] PIN FRAUD AND SHOCK PREVENTION SYSTEM

[76] Inventor: H. Weaver Jordan, 2189 NW. 53rd St., Fort Lauderdale, Fla. 33309

[21] Appl. No.: 509,859

[22] Filed: Apr. 17, 1990

[51] Int. Cl.⁵ .......................................... H04M 17/02
[52] U.S. Cl. ..................................... 379/145; 194/202
[58] Field of Search ............... 379/145, 150, 155, 146; 194/202

[56] References Cited

U.S. PATENT DOCUMENTS

| | | | |
|---|---|---|---|
| Re. 16,615 | 5/1927 | Hovland. | |
| 1,989,621 | 1/1935 | Lesoine | 179/6.4 |
| 2,765,366 | 10/1956 | Holden | 179/6.3 |
| 4,429,183 | 1/1984 | Nemecsek | 179/6.3 R |
| 4,821,313 | 4/1989 | Grantland | 379/145 |
| 4,862,494 | 8/1989 | Matheny | 379/145 |
| 4,922,525 | 5/1990 | Dernovsek | 379/145 |

*Primary Examiner*—Stafford D. Schreyer
*Attorney, Agent, or Firm*—Oltman and Flynn

[57] ABSTRACT

A pin fraud and shock prevention circuit for a pay telephone which has a receiver and transmitter, a tip and ring conductor forming a current loop connecting the pay telephone to a telephone exchange, and which has a current sensor in the ring conductor, a plurality of current switches coupled to the current sensor for connecting the receiver and transmitter to the loop in response to current flowing in the loop.

12 Claims, 3 Drawing Sheets

NORMAL OPERATION:
  R = −48 V
  T = +48 V
  G = NEUTRAL

COIN-PRESENT TEST:
  R = OPEN
  T = +48 V

INITIAL RATE COIN TEST:
  R = OPEN
  T = −48 V

COIN COLLECT:
  R = OPEN
  T = +130 V
  G = −130 V

COIN RETURN:
  R = OPEN
  T = −130 V
  G = +130 V

PIN FRAUD AND SHOCK PREVENTION SYSTEM

BACKGROUND AND PRIOR ART

The invention relates to a system for preventing fraud and shock hazard on coin telephones, and more particularly for preventing pin fraud and shock hazard from a frayed handset cord of a coin telephone.

It has become known that two types of fraud can be perpetrated on public coin telephones by fraudulently providing a low resistance connection between the handset transmitter and a grounded object, for example the frame of the coin telephone. The fraudulent connection is usually provided by driving a strong pin through the plastic surrounding the transmitter in the handset and connecting the pin to ground. In this manner local calls can be completed without depositing the initial rate coin(s), and toll calls can be completed when the ground connection to the transmitter is applied shortly before going on-hook, in which case the coin collect signal is shorted, preventing the coins from being sent to the coin box, after which the coins can be refunded to the caller.

Pin fraud causes damage to the telephone and expenses to the telephone company, which must still pay a share of the toll to the long distance carrier.

Prior art for prevention is known for example from U.S. Pat. No. 4,862,494, which shows circuitry that senses a fraudulent ground connection inside the handset. Other inventions accomplish the same object in various ways.

The prior art inventions have various drawbacks, in that they do not prevent the performance of a fraudulent call, and are difficult to implement and require additional signalling to inform the control office personnel of the fraudulent arrangement.

Another problem with the existing coin telephones is that they can cause an electric shock to a user if the handset cord has become frayed and shows bare copper conductors, which, if touched at the moment a high voltage signal is transmitted to the coin telephone, can cause a surge shock hazard to a user of the telephone.

The instant invention prevents both the possibility of perpetrating a pin fraud and also completely eliminates the shock hazard from a frayed or damaged handset cord.

SUMMARY OF THE INVENTION

In accordance with the invention there is provided a pin fraud and shock prevention circuit for a pay telephone which has a receiver and transmitter, a tip and ring conductor forming a current loop connecting the pay telephone to a telephone exchange, and which has a current sensor in the ring conductor, a plurality of current switches coupled to the current sensor for connecting the receiver and transmitter to the loop in response to current flowing in the loop.

In accordance with a further feature, there is provided a circuit wherein the current sensor has a relay coil coupled to the plurality of switches, and wherein the plurality of switches include two switches connecting the receiver to the loop, and two switches connecting the transmitter to said loop.

According to a further feature, the aforesaid switches are reed relay switches.

According to still another feature, the current sensor has a resistance less than 40 ohms. The current sensor operates the switches at at least 15 milliamperes of current flowing in the ring conductor. The switches have operate/release times no exceeding 1 millisecond, and the current sensor has a must-operate current value being less than the minimum loop current value and a must-release current value being greater than the maximum loop inactive current value.

In the circuit according to the invention, the current sensor is disposed in the ring conductor behind a hook switch, and the circuit may include a keypad for DTMF dialling, wherein the current sensor and current switches are disposed in said keypad.

The current sensor may optionally be a light emitting diode and at least one of said switches may be an optotransistor.

Further objects and advantages of this invention will be apparent from the following detailed description of a presently preferred embodiment which is illustrated schematically in the accompanying drawings.

DESCRIPTION OF THE PREFERRED EMBODIMENTS

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
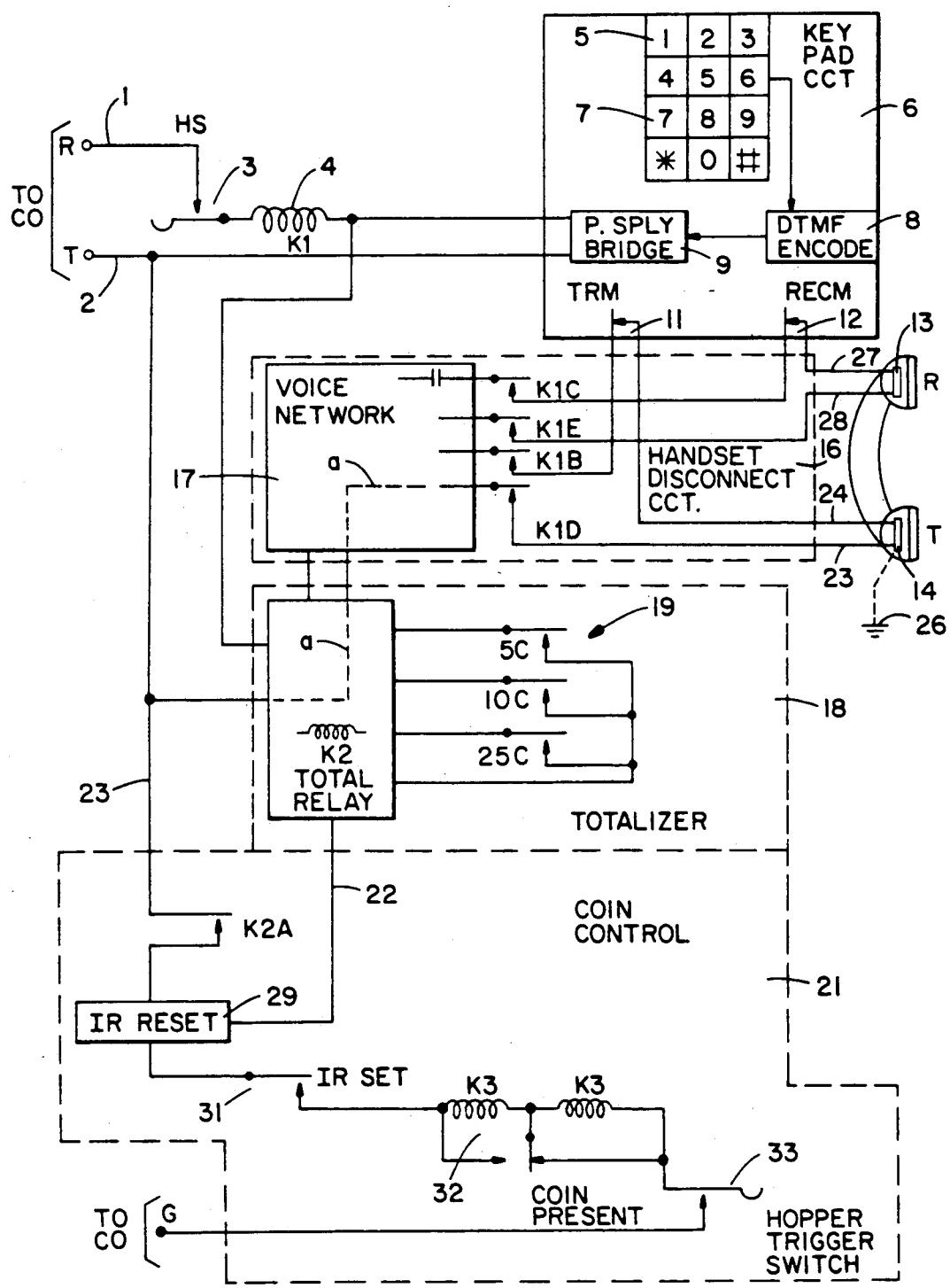
FIG. 1 is a block diagram of a coin telephone showing the elements of the invention installed therein.

In FIG. 1, two conductors Ring 1 and Tip 2 connect a keypad circuit 6 of the coin telephone with a central office CO via a hook switch 3 and a current sensor 4, e.g., in the form of a relay coil.

The keypad circuit 6 has a conventional keyboard 7 with 3 by 4 push keys 5, connected via a DTMF (Dual Tone Multi-Frequency) encode circuit 8, which converts the operations of the keyboard 7 into dual signalling tones that are transmitted to the central office CO via conductor T & R and a power supply bridge circuit 9 which provides power for tone oscillators built into the keyboard 7, in well-known manner. Two switches, "Transmitter Mute" 11 (TRM) and "Receiver Mute" 12 are coupled to the keyboard 7 to disconnect the receiver 13 and transmitter 14 during operation of the keys 5.

Figure 3:
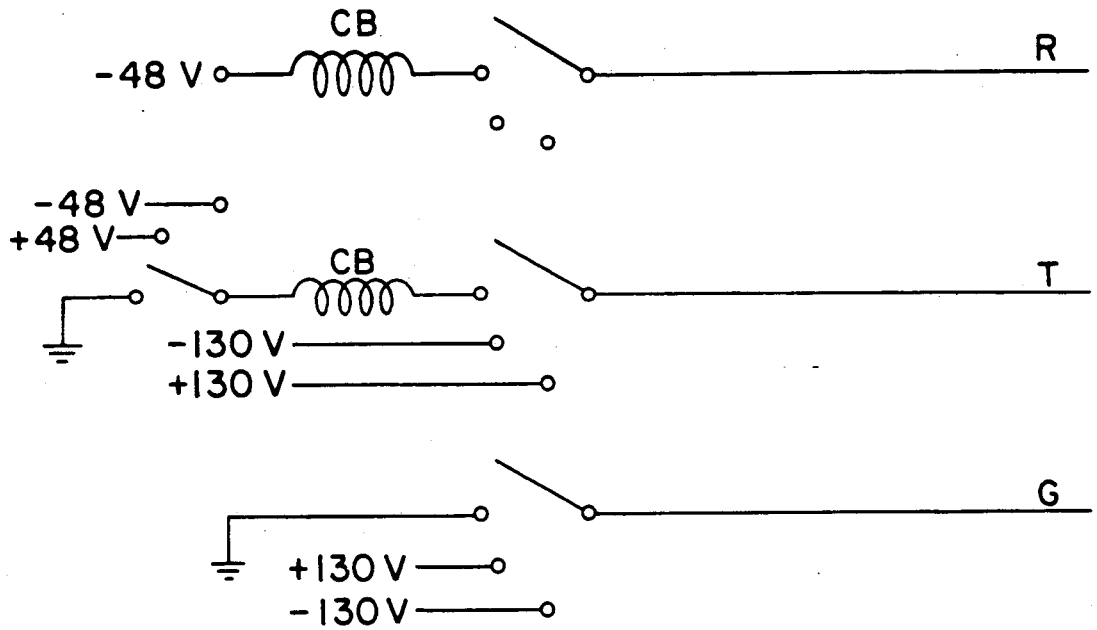
FIG. 3 is a simplified diagram of a part of a telephone exchange interconnection with a coin telephone and a table showing the various signalling states of a coin telephone.

A voice network 17 of conventional construction is connected to the tip and ring conductors 2, via a totalizer 18, having coin deposit detectors 19 that signal coin deposits of coins 5C, 10C and 25C to the central office CO in conventional manner. The totalizer 18 has a relay coil K2 that responds to dc signals from the central office, typically in the form of plus or minus 48 volts on the tip conductor 2 as shown in FIG. 3. The totalizer 18 responds to the two signals "coin present test" and "initial rate coin test". The totalizer 18 is connected via lead 22 to a coin control circuit 21 and lead 23 to the tip conductor 2, from where it receives signals "coin collect" and "coin return" in the form of respective positive 130 volts and minus 130 volts on the tip conductor from the central office as shown in FIG. 3, using ground conductor G as return lead.

A latching coin control relay K3 having its relay coil divided into two half parts K3 responds to the "coin collect" signal by dropping coins present in a coin chute into a coin box, and to the "coin return" signal by allowing the coins to drop into a coin return chute on the coin telephone, so that the coins can be retrieved by the user of the telephone.

If one of the conductors 23,24 of the transmitter 14, are connected to ground due to a fault or a fraudulently applied ground connection, such as a pin through the transmitter housing, it follows that the "coin return" or "coin collect" signal applied to the tip lead will be leaked off via the fraudulent ground, even if the ring conductor 1 is disconnected at the central office at that time, and the coin collect relay will therefore be unable to operate end allow the coins stored in the coin chute to be dropped into the coin box.

A caller can, after having made a toll call, begin to make a subsequent local call and, after receiving dial tone, have the coins returned when he hangs up, before dialling a number. Applicant's invention prevents the fraudulent operation by means of a relay having coil K1 (4) in the ring conductor 1, which is sensitive enough to operate four contacts K1C, K1E, K1B and K1D at the minimum current flow in the ring conductor which is fifteen milliamperes. The leak path is shown by dotted lines (a) from tip conductor 2, through voice network 17 and a direct connection 23 to a fault ground 26 at the transmitter 14. The presence of an open switch K1D in lead 23, according to the instant invention, will prevent the coin-collect signal from being leaked off and thus prevent the fraud from succeeding.

Additionally, an uninsulated spot on a frayed handset cord 23,24,27,28 will pose no shock hazard to a person who may be touching the cord at the time one of the "coin collect" or "coin return signal" is applied.

The normal path for the "coin collect" or "coin return" signal is from the tip conductor 2, contacts K2A of the totalizer relay K2, initial rate reset circuit 29, initial rate set contacts 31, windings K3 of the coin-collect/coin-return relay 32, hopper trigger contacts 33 and ground G.

Figure 2:
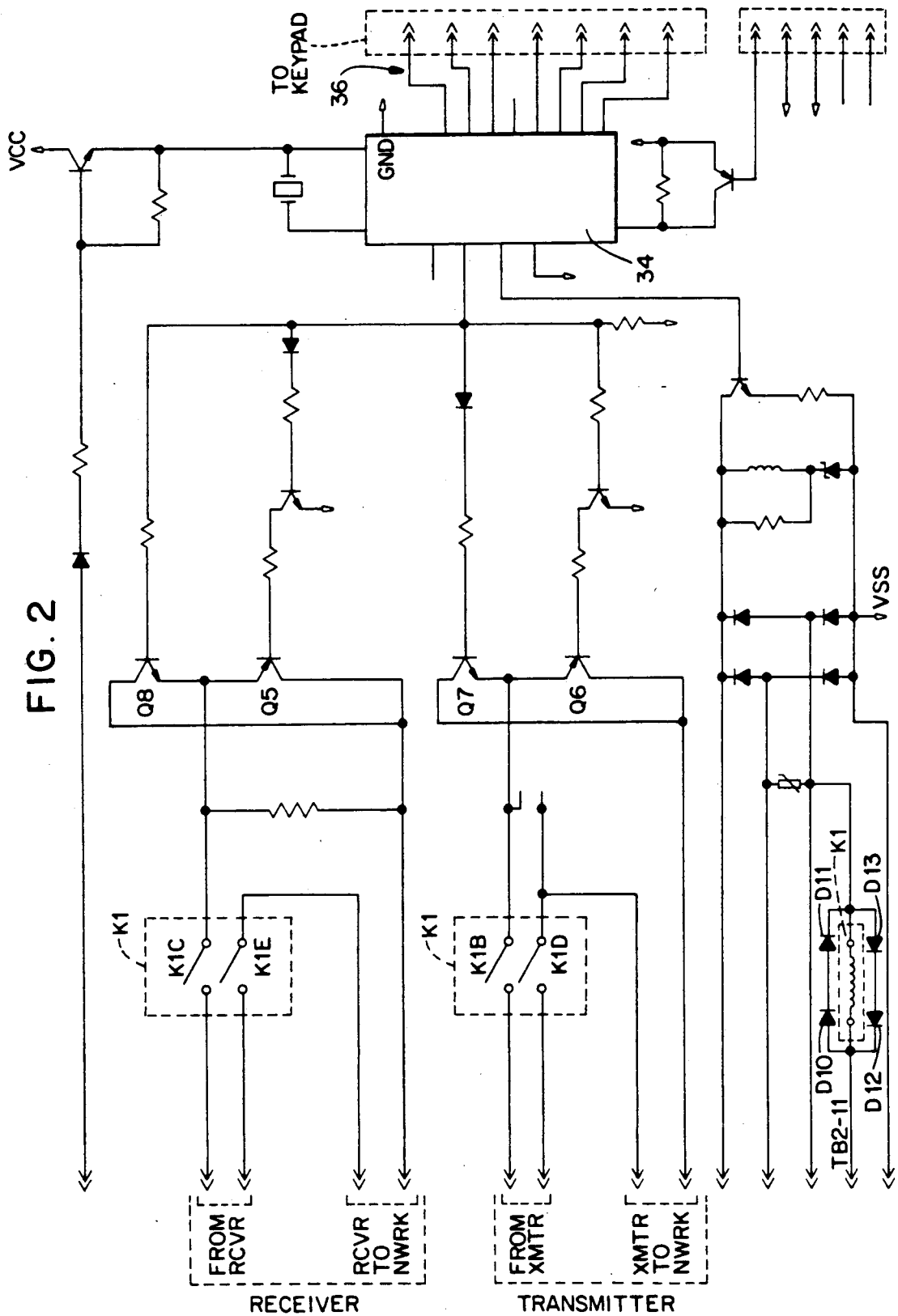
FIG. 2 is a circuit diagram of a keypad for a coin telephone which includes the elements of the invention.

The physical location of the relay K1 is advantageously within the keypad circuit 6, as shown in FIG. 2, which is a circuit diagram of a DTMF tone generator, which has connections 36 to a keypad (7 in FIG. 1). The relay K1 could be in different sections of the coin station network such as the totalizer.

The coil K1 is shown in the lead TB2-11 which connects the hook switch 3 in FIG. 1. The coil K1 is parallel-connected with two antiparallel diode pairs D10,D11 and D12,D13, which insure a maximum voltage drop of 1.5-2 volts across the coil in both directions. The two mute switches 11 and 12 (TRM, RECM) in FIG. 1 are realized as transistor pairs Q8, Q5 and Q7, Q6.

It follows that the function of switches K1C, K1E, K1B and K1D could alternatively be performed by solid state switches, e.g. thyristors, transistors or SCR's controlled by a current sensor, in the form of e.g. an LED optically coupled to the solid state switch, instead of a relay coil K1.

Other methods of current sensing can be performed by a saturating transformer coupled to a thyristor or the like, in well-known manner.

I claim:

1. A pin fraud and shock prevention circuit for a pay telephone having a receiver and transmitter, and a tip and ring conductor forming a current loop connecting the pay telephone to a telephone exchange, comprising a current sensor in said ring conductor, a plurality of current switches coupled to said current sensor for connecting said receiver and transmitter to said loop in response to current flowing in said loop.

2. A circuit according to claim 1 wherein said current sensor includes a relay coil coupled to said plurality of switches.

3. A circuit according to claim 2 wherein said plurality of switches include two switches connecting said receiver to said loop, and two switches connecting said transmitter to said loop.

4. A circuit according to claim 2, wherein said switches are reed relay switches.

5. A circuit according to claim 2 wherein said current sensor has a resistance less than 40 ohms.

6. A circuit according to claim 1 wherein said current sensor operates said switches at at least 15 milliamperes flowing in said ring conductor.

7. A circuit according to claim 1 wherein said switches have operate/release times not exceeding 1 millisecond.

8. A circuit according to claim 1, wherein said current sensor has a must-operate current value being less than the minimum loop current value and a must release current value being greater than the maximum loop inactive current value.

9. A circuit according to claim 1, including a hook switch in said ring conductor, wherein said current sensor is disposed in said ring conductor behind said hook switch.

10. A circuit according to claim 1 including a keypad for DTMF dialling, wherein said current sensor and current switches are disposed in said keypad.

11. A circuit according to claim 1, wherein said current sensor is a light-emitting diode and at least one of said switches is an opto-transistor, optically coupled to said light-emitting diode.

12. A circuit according to claim 1 including two anti-parallel diode pairs connected across said current sensor.

* * * * *